United States Patent [19]

Stotler et al.

[11] 4,222,758
[45] Sep. 16, 1980

[54] APPARATUS FOR PROCESSING FILAMENTS

[75] Inventors: David V. Stotler; James E. Sanders, both of Newark, Ohio

[73] Assignee: Owens-Corning Fiberglas Corporation, Toledo, Ohio

[21] Appl. No.: 973,823

[22] Filed: Dec. 27, 1978

[51] Int. Cl.² .............................................. C03B 37/02
[52] U.S. Cl. ....................................... 65/11 W; 65/2; 226/196; 426/66
[58] Field of Search .................. 226/196; 65/2, 11 W; 425/66

[56] References Cited

U.S. PATENT DOCUMENTS

| | | | |
|---|---|---|---|
| 3,244,383 | 4/1966 | Ballmer et al. | 65/11 W X |
| 3,269,816 | 8/1966 | Helbing | 65/2 |
| 3,414,956 | 12/1968 | Genson | 65/11 W X |
| 3,467,739 | 9/1969 | Underwood et al. | 264/40 |
| 3,511,625 | 5/1970 | Pitt | 65/4 R |
| 3,865,565 | 2/1975 | Spence et al. | 65/2 |
| 4,050,639 | 9/1977 | Jackson | 65/11 W X |
| 4,130,248 | 12/1978 | Hendrix et al. | 65/11 W X |

FOREIGN PATENT DOCUMENTS 1247568  8/1967  Fed. Rep. of Germany ......... 65/11 W Primary Examiner—Robert L. Lindsay, Jr.
Attorney, Agent, or Firm—Ronald C. Hudgens; Philip R. Cloutier; Greg Dziegielewski

[57] ABSTRACT

Apparatus for producing continuous glass filaments is provided to facilitate the start-up or restart of a system wherein said filaments are attenuated by means of a rotatable member in contact with said filaments as a plurality of spaced apart bundles having a predetermined number of filaments in each bundle.

7 Claims, 5 Drawing Figures

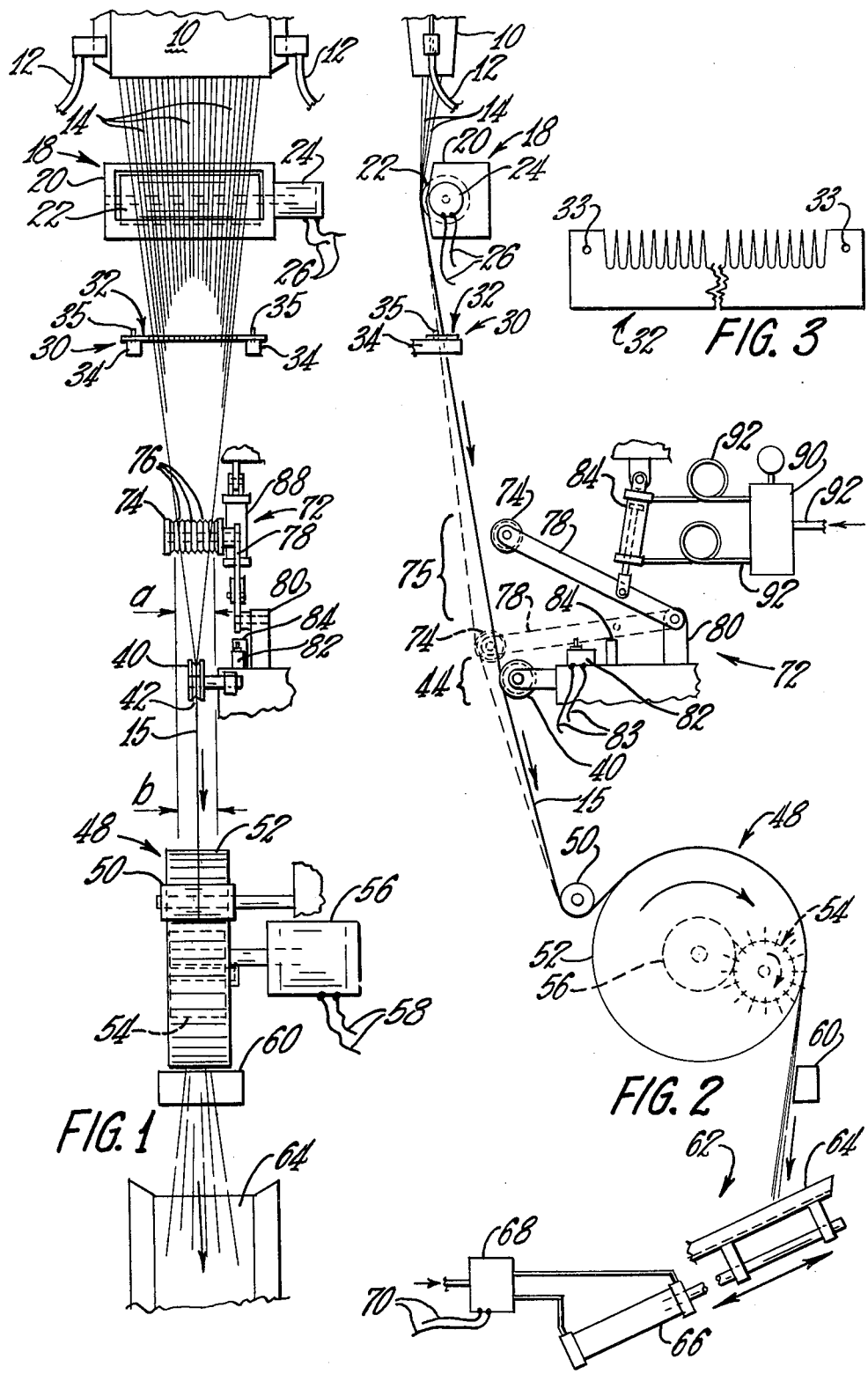

APPARATUS FOR PROCESSING FILAMENTS

BACKGROUND OF THE INVENTION

Mats comprised of continuous filaments have been produced by attenuating streams of molten material into filaments by the action of a pull wheel as is well known in the art. The filaments contact the surface of the rotating pull wheel for a portion of the pull wheel circumference and then are directed to a conveyor to be collected as a mat. The filaments are urged away from the surface of the pull wheel by a number of factors, one of which is the number of filaments in a bundle or the mass of the bundle at the surface of the pull wheel.

Generally, such operations deliver a plurality of filaments to the surface of the pull wheel as a plurality of spaced apart bundles of filaments or substrands, each of the bundles being in contact with the circumferential surface of the pull wheel.

It has been found that, given substantially identical filaments, the number of filaments in each bundle affects the point at which the bundle separates from the surface of the pull wheel. The bundles having a greater number of filaments tend to leave the surface of the pull wheel sooner than those bundles having a lesser number of filaments.

With pneumatic and/or mechanical filament or bundle distribution systems, as known in the art, such differences in bundle spacing and size can lead to undesirable filament or bundle distributions in the resulting mat.

Previously, filaments from a given fiber forming position were laboriously manually divided into the spaced-apart bundles. In the event of a system disruption the individual bundles had to be redefined by hand which obviously contributed to extended non-production time for the system.

Two patents indicative of previous systems for forming continuous strand mats are disclosed in U.S. Pat. Nos. 3,467,739 and 3,511,625 issued to Underwood et al and R. E. Pitt, respectively.

SUMMARY OF THE INVENTION

According to this invention, there are provided method and apparatus for positioning advancing filaments comprising: providing a first gathering means adapted to orient said filaments as a strand at a region and to orient said filaments approaching said first gathering means in a predetermined array; providing a second gathering means spaced from said first gathering means, said second gathering means being adapted to contact said array of filaments to orient said filaments as a plurality of spaced-apart bundles of filaments having a predetermined number of said filaments in each of said bundles; and moving said first gathering means and said second gathering means with respect to each other such that said filaments contact said second gathering means to be advanced to said region as a plurality of spaced-apart bundles of filaments having a predetermined number of said filaments in said bundles.

Accordingly, it is a general object of the present invention to provide a system capable of dividing said filaments into a plurality of spaced-apart bundles of filaments wherein each of said bundles has substantially the same number of filaments therein.

The foregoing, as well as other objects of the present invention, will become apparent to those skilled in the art from the following detailed description.

DESCRIPTION OF THE DRAWINGS

FIG. 1 is a front elevational view of a fiber forming position.

FIG. 2 is a side elevational view of the fiber forming position shown in FIG. 1.

FIG. 3 is a plane view of one of the components of the fiber forming systems shown in FIGS. 1 and 2.

DESCRIPTION OF THE INVENTION

Figure 4:
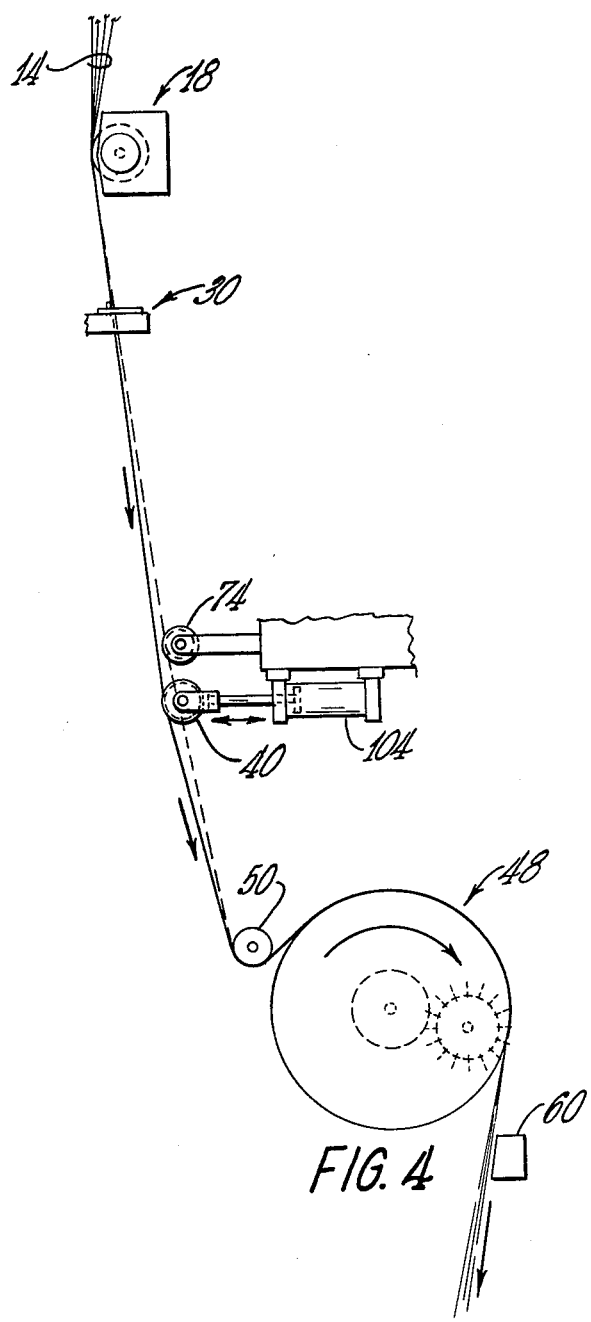
FIG. 4 is a side elevational view of another embodiment of the invention.

As shown in FIGS. 1 and 2, feeder 10, which is electrically connected to a suitable supply of power by means of leads 12, is adapted to supply a plurality of streams of molten or heat softened material which are attenuated into filaments 14. Such material and filaments can be of any suitable thermoplastic type such as glass or a suitable polymeric material such as polyester, polypropylene and the like.

Generally, a coating such as a size or binder is applied to the filaments 14 by means of an applicator 18 located adjacent feeder 10. Coating applicator 18 is comprised of a housing 20 having a coating application surface such as a movable, substantially smooth graphite roll 22 rotatably journaled therein. Applicator surface 22 is suitably driven by motor 24 connected to suitable supply of power by means of leads 26 as is known in the art.

Assuming an initial start-up or a restart, the forming room operator gathers the initial filaments into a single strand 15 and positions said strand 15 in circumferential groove 42 of first member or gathering means 40. Ultimately, the single strand 15 is placed in contact with attenuation means 48 to advance the filaments and attenuate the streams of molten material into filaments 14.

To orient filaments 14 as a plurality of spaced apart bundles of filaments at attenuation means 48, filament orientation assembly 72 is adapted to position the filaments as a plurality spaced-apart bundles having a predetermined substantially equal number of filaments in each bundle and to remove said filaments from the first member or gathering means 40.

Since the applicator surface 22 is substantially smooth, a positioning means 30 is provided intermediate said applicator 18 and said filament orientation assembly 72 along the path of advancement of the filaments to locate said filaments on the applicator 18.

Positioning means 30, as shown in FIG. 3, is comprised of a toothed element or splitter comb 32 which can be manually or mechanically inserted into the fan of filaments immediately below applicator 18. Element 32, which has a predetermined number of teeth to define a predetermined number of "splits" or groups of filaments between the teeth, is then moved along the path of advancement of the filaments away from applicator 18 and positioned on base 34 by means of any suitable fastener 35. For example, element 32 having apertures 33 is adapted to slidably engage pins 35 projecting upwardly from base 34. It has been found that of processing glass filaments element 32 should be made from a non-abrading material such as micarta.

In practice, positioning means 30 provides a system whereby the relative position of the filaments is maintained on the surface 22 during operation. As such, filaments 14 are advanced as a single strand 15 at a first zone 44 at the first member or gathering means 40. Also, member 40 is positioned to gather said filaments as a single strand 15 such that said filaments are advanced in a predetermined array of filaments approaching said member 40. To define or orient the mass of advancing filaments 14 as a plurality of spaced-apart bundles of filaments, filament orientation assembly 72 is adapted to contact said advancing filaments 14 at a second zone 75 spaced from said first zone 44.

Filament orientation assembly 72 is comprised of a second gathering means or member 74 having a plurality spaced apart circumferential grooves 76 adapted to gather filaments 14 which are positioned in a predetermined array as groups of filaments at said second zone 75 to collect said filaments as a plurality of substantially equally spaced-apart bundles of filaments having a predetermined substantially equal number of filaments in each bundle. The number of "splits" should be equal to the number of grooves 76, each "split" being accommodated by an individual groove 76.

As shown in FIGS. 1 and 2, first member 40 is fixed and second member 74 is adapted to moved relative thereto, and first member 40 and second member 74 can be made of any suitable material such as graphite.

As shown in FIG. 2 second member 74 is rotatably journaled at one end of arm 78. In the retracted position, second member 74 is out of contact with the array of advancing filaments. Arm 78 is suitably journaled in bracket 80 at the opposite end thereof.

Attached to bracket 80, sensing means or magnetic limit switch 82 is electrically interconnected via leads 83 with a suitable control system to modify the temperature of the feeder 10 and rotational speeds of the applicator 18 and attenuation means 48 as will be explained later.

Post 84, which is rigidly attached to bracket 80, is adapted to provide a positive stop for arm 78 at the extended or production position.

Arm 78 is adapted to be releasably held in the retracted or extended position by any suitable means such as spring loaded detents or magnets and the like. Furthermore, arm 78 can be manually or mechanically operated. As shown in FIG. 2, arm 78 is adapted to be pivoted about the end journaled at bracket 80 by means of a second motive means 88. Second motive means 88 can be any suitable device such as a double acting air cylinder. Air cylinder 88 is operably interconnected with valve 90 which is connected to a suitable supply of pressurized air (not shown) by means of tubing 92. Valve 90 can be solenoid or manually operated.

When activated, arm 78 moves second member 74 along an arcuate path to contact the splits of filaments 14 positioned in a predetermined array at second zone 75 to move said filaments from the surface of first member 40. Second member 74 has a predetermined number of circumferential grooves extending about the periphery thereof aligned with the splits. Said array of filaments 14 at said second zone 75 contacts said second member 74 such that said filaments are urged into a predetermined number of spaced-apart bundles of filaments having a predetermined number of filaments in each bundle. Once defined as the plurality of spaced-apart bundles, said bundles advance to and maintain the spaced-apart relationship at the advancing or attenuation means 48.

As shown in FIG. 1 the width of the bundles of filaments advancing from second member 74 at point "a" is substantially maintained as the bundles are advanced along the surface of attenuation means 48.

As shown, the spaced apart bundles contact idler roll 50, which has a substantially smooth circumferential surface, and are advanced to the circumferential surface of louvered wheel 52 of pull wheel 48. As known in the art, spoked wheel 54, which is located within louvered wheel 52 urges the bundles of filaments from the surface of the louvered wheel 52. Wheels 52 and 54 are suitably driven by means of motor 56 electrically connected with a suitable source of power by means of leads 58.

As the bundles of filaments leave the surface of the pull wheel 48, bundle dispersion system 60, such as an oscillatory fluidic blower as is known in the art, distributes the bundles across the width of conveyor (not shown) located beneath the pull wheel 48.

During the periods that the filaments are being advanced as a single strand 15, it is desirable to collect said filaments in scrap system 62. Scrap system 62 is comprised of chute 64 which is retractably moved by means of a first motive means or double acting air cylinder 66 beneath attenuation means 48. Air cylinder 66 is controlled by means of solenoid valve 68 having electrical leads 70 attached thereto. Solenoid valve 68 is connected to a suitable supply of pressurized air (not shown).

In an alternative embodiment as shown in FIG. 4, second member or gathering means 74 is fixed while first gathering means or member 40 is adapted to move relative to said second gathering means 74. Thus, as the filaments 14 are advanced from coating applicator 18 to first member 40 positioned in an extended mode, said filaments are advanced as a single strand to attenuation means 48. Second member 74 is positioned along the path of advancement of filaments 14 at a point wherein said "splits" of filaments approaching member 40 are oriented in a predetermined array.

To orient the filaments as a plurality of spaced apart bundles of filaments having a predetermined number of filaments in said bundles, air cylinder 104 is energized to retract or move first member 40 substantially transverse to the path of the advancing filaments such that the second member 74 contacts such array of filaments to advance said filaments as said plurality of bundles to the advancing means 48. Obviously, the first member 40 continues to retract to a position out of contact with the filaments 14.

In processing glass filaments at fiber forming positions as shown in FIGS. 1 and 2 it is been found that it is desirable, at start-up or restart, to increase the tension on the filaments to more precisely define the array of "splits of" filaments at the second zone 75. The tension on the filaments 14 can be increased by decreasing the temperature of the feeder 10 and the streams of molten material issuing therefrom. In producing continuous glass filaments at speeds and temperatures known in the art, it has been found that a reduction in temperature of about 10° to 20° F. is sufficient.

Furthermore, it has been found in the reduction in the speed of advancement of the filaments 14 also facilitates a more efficient start-up. As such, it has been found that reducing the surface speed of the applicator surface 22 and the attenuation means 48 to approximately one half of the production speed improves restart efficiencies.

It is to be understood that the feeder temperature control system, the applicator speed control system, and the pull wheel speed control systems, as are known in the art, can be individually, manually activated or activated by a number of suitable electronic control systems according to the principles of this invention. However, such control systems can be electrically interconnected with the sensing means 82 provide for a semi-automatic operation as shown in FIGS. 1 and 2.

Figure 5:
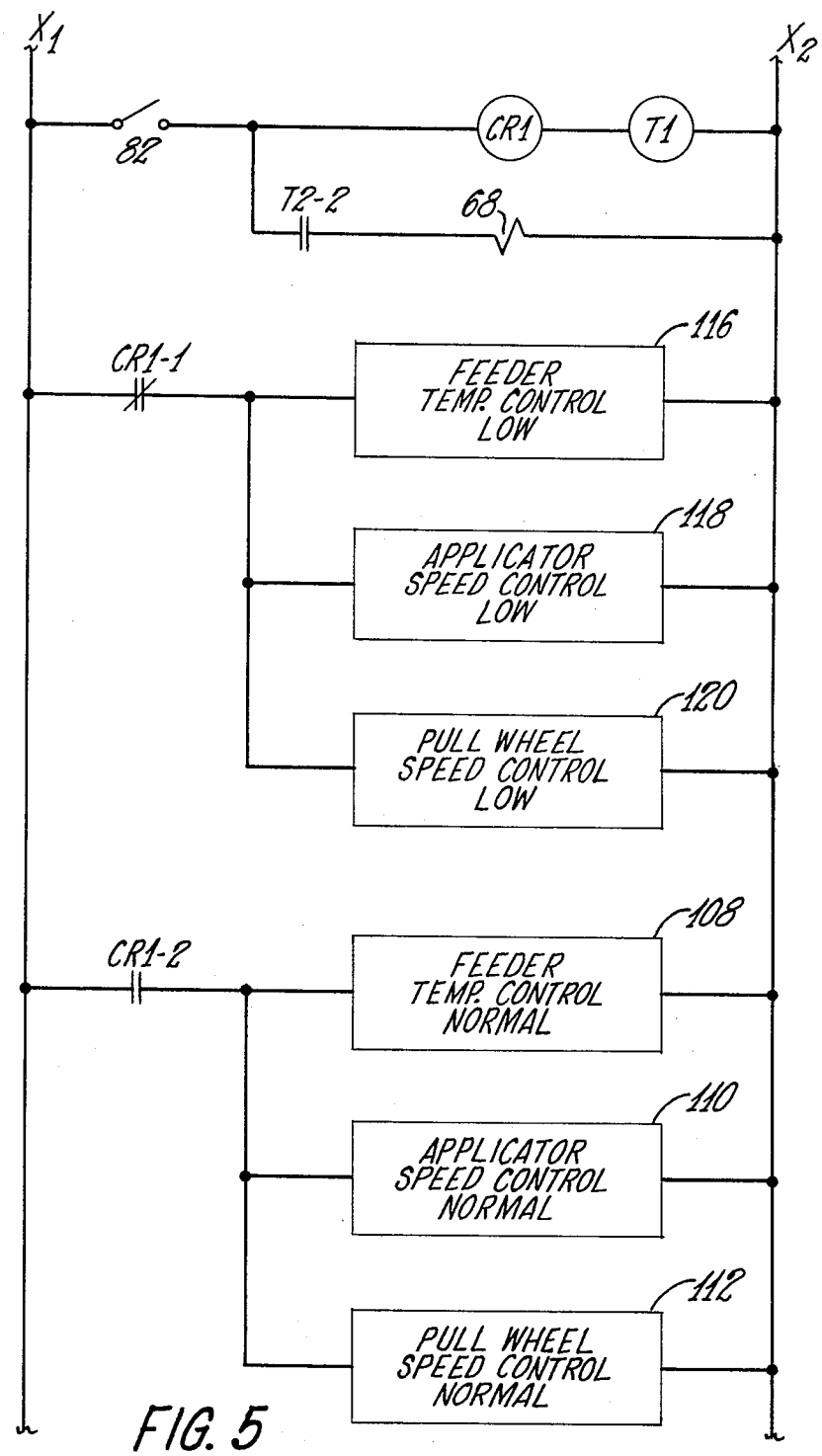
FIG. 5 is a diagram of a circuit for controlling a portion of the system shown in FIGS. 1 and 2.

As shown in FIG. 5 leads X1 and X2 are attached to a suitable supply of power. The sensing means or limit switch 82, which is activated by arm before 78, is open when arm 78 is in the retracted position. Switch 82 energizes relay CR1 when closed or in the operating position.

When relay CR1 is energized, feeder temperature control system 108, applicator speed control system 110, and pull wheel speed control system 112 for the normal operational mode are energized by normally open contacts CR1-2.

As switch 82 is opened when the operation raises arm 78, relay CR1 is de-energized, thus opening contact CR1-2 while closing contacts CR1-1. Thus the bushing temperature control system 116, the applicator speed control system 118, and pull wheel control system 120 for the start-up or low speed mode are activated.

After the forming room operator is satisfied that the system is ready to go back into the production mode, the operator causes arm 78 to move into operating position thus closing switch 82 which energizes relay CR1 and timed relay T1. Thus contacts CR1-2 close thus activating the normal operation mode control systems. Simultaneously contacts CR1-1 open deactivating the restart of low speed control systems 116, 118 and 120 to return bushing 10, applicator 18, and pull wheel 48 to the normal production mode.

Generally, it is desirable to have the scrap chute deployed when the fiber forming system is not operating in the normal operational mode. And as shown in FIG. 5 solenoid operated valve 68 which controls air cylinder 66 is deactivated when switch 82 is opened. However, it is desirable to delay the retraction of the scrap chute for a predetermined time to allow undesirable filaments to be purged from the system. As such the normally open contacts T1-1 do not close for a predetermined period of time, approximately five seconds, until timer T1 times out after it is activated.

It will be appreciated that variations in constructional features, as well as substitutiom of equivalent components and methods, can be undertaken without departing from the spirit and scope of the present invention.

We claim:

1. Apparatus for processing filaments:
   a feeder adapted to supply a plurality of streams of material at a first temperature;
   attenuation means adapted to attenuate said streams into said filaments at a first speed;
   a first member adapted to gather said filaments into a strand in contact with said attenuation means and to orient said filaments in a predetermined array approaching said first member;
   a second gathering means adapted to orient said filaments to approach said attenuation means as plurality of spaced-apart bundles of filaments having a predetermined number of filaments in said bundles;
   first control means for modifying the temperature of said feeder to supply said streams at a second temperature;
   second control means adapted to operate said attenuation means at a second speed;
   means for moving said first member and said second member with respect to each other such that said second member contacts said array to orient said filaments to contact attenuation means as a plurality of spaced-apart bundles of filaments; and
   sensing means for activating said first and second control means adapted to operate said feeder at said second temperature and operate said attenuation means at said second speed when said second member is not in contact with said filaments.

2. Apparatus of claim 1 further comprising an applicator means adapted to contact said filaments intermediate said feeder and said first member to apply a coating to said filaments, the speed of said applicator means being reduced while said feeder is operating at said second temperature.

3. The apparatus of claim 2 further comprising a positioning means adjacent said applicator to locate said filaments advancing past said applicator.

4. The apparatus of claims 2 or 3 wherein said applicator has substantially smooth applicator surface.

5. The apparatus of claim 1 wherein said second member is a rotatable, cylindrical member having plurality of circumferential grooves oriented substantially perpendicular to the axis of rotation thereof.

6. The apparatus of claims 1 or 5 wherein said second member is adapted to initially contact said array of filaments and move towards said first member to remove said filaments from said first member to advance said filaments as a plurality of spaced-apart bundles of filaments having a predetermined number of filaments in each of said bundles.

7. The apparatus of claim 6 wherein said second member is adapted to activate said sensing means to control the temperature of said feeder and the speed of said attenuation means when said second member is not in contact with said filaments.

* * * * *